Oct. 28, 1924.                                                     1,512,958
W. M. TURNLEY
DRY CELL BATTERY
Filed Feb. 5, 1921

Inventor
William M. Turnley
by H. J. S. Dennison atty.

Patented Oct. 28, 1924.

1,512,958

UNITED STATES PATENT OFFICE.

WILLIAM MICOU TURNLEY, OF TORONTO, ONTARIO, CANADA.

DRY-CELL BATTERY.

Application filed February 5, 1921. Serial No. 442,627.

*To all whom it may concern:*

Be it known that I, WILLIAM MICOU TURNLEY, a citizen of the United States of America, and resident of the city of Toronto, county of York, Province of Ontario, in the Dominion of Canada, have invented certain new and useful Improvements in Dry-Cell Batteries, described in the following specification and illustrated in the accompanying drawings, that form part of the same.

The principal objects of the invention are to eliminate the high percentage of losses due to refunding customers on batteries which are not defective, and to devise a means for enabling the proper testing of a battery for defects in construction without mutilating the battery.

The principal feature of the invention consists in arranging for an electrical contact being made with the negative pole of the positive terminal cell of a battery so that a comparative test of the individual cell and the battery of cells may be made.

Figure 1:
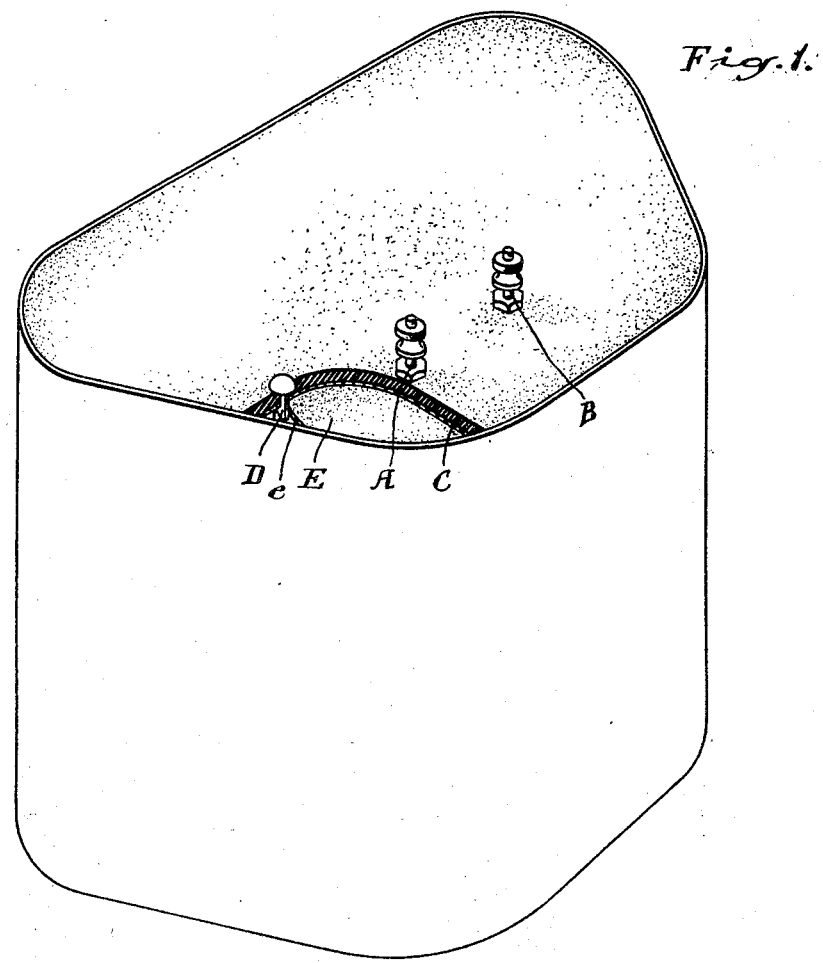

In the drawings, Figure 1 is a perspective view of a five cell battery showing the covering broken away to disclose the connection of the test contact connected to the zinc container of the positive terminal cell.

Figure 2:
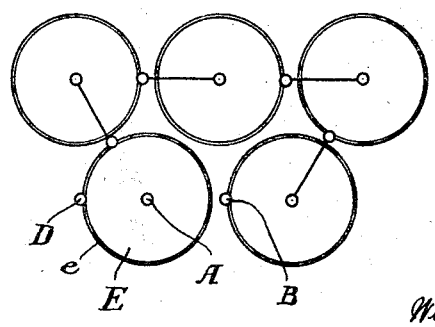

Figure 2 is a diagrammatic plan view showing the arrangement of the cells in a series connection.

The sale of group cells has developed to very large proportions and it is found that a very high percentage of batteries sold are returned as being defective after having left the dealers' hands. The only method of testing such batteries is to connect the terminals with an ammeter and if the amperage is low, the customer's word is usually accepted and a new battery given. It has been found with batteries returned that about 90% are not defective, but in order to determine whether the cells are defective or not it is necessary to break the cells apart, destroying the enveloping casing.

In the ordinary construction of multiple cell batteries the cells are connected together, negative to positive in series in the desired arrangement of grouping. When they are so placed they are enclosed in a covering which insulates the connections, leaving merely the terminal contacts exposed. These contacts A and B are connected with the positive pole of one terminal cell and the negative pole of the other terminal cell so that when the wires are connected to these terminals the full potential of the series of cells is obtained. If the potential is lowered it is impossible to test the various cells because of the insulating covering C which is usually an asphaltum substance poured over the top.

This invention is extremely simple in that it merely requires that the negative pole of the positive terminal cell shall be accessible without disturbing or mutilating the enclosing covering. As herein shown the cell E is provided with an extra terminal to project above the top insulation and a metallic member D is secured to the zinc casing e. This contact projects above the asphaltum cover and enables a test being made to determine the reading of this single cell, after which the reading of the series may be taken. A similar result may be obtained by arranging an opening through the casing to allow of a contact being made with the zinc casing.

If the reading of both tests appears to be about equal, no matter what the strength may be, then the person making the test may be assured that the batteries are not defective and if the reading is merely low the fault must lie with the customer, as he should ascertain when purchasing if the battery tests up to full strength. If it is found upon testing that there is a corresponding amperage in the single cell and in the series, then it is obvious that the customer has either worked out the battery or that it has been bled by a short circuit in some manner, for which condition the battery maker and therefore the dealer is not to blame and the loss must rest with the customer.

Such an arrangement will effect a very great saving to the manufacturer for the loss under such conditions is at present universally borne by him, as there is no means of testing the battery without destroying the outer casing.

The invention involves practically no extra expense and is extremely simple and may be applied to any group arrangement of cells.

What I claim as my invention is:—

A battery, comprising, a group of dry cells having their electrodes permanently connected in series and the connections embedded in a fused insulating cover, one end cell having one terminal only extending through the insulation and the other end cell having both terminals extending through the insulation to enable access thereto for testing purposes.

WILLIAM MICOU TURNLEY.